Feb. 26, 1924.
C. F. BOMPART
HAND TRUCK
Filed Oct. 5, 1922
1,484,864
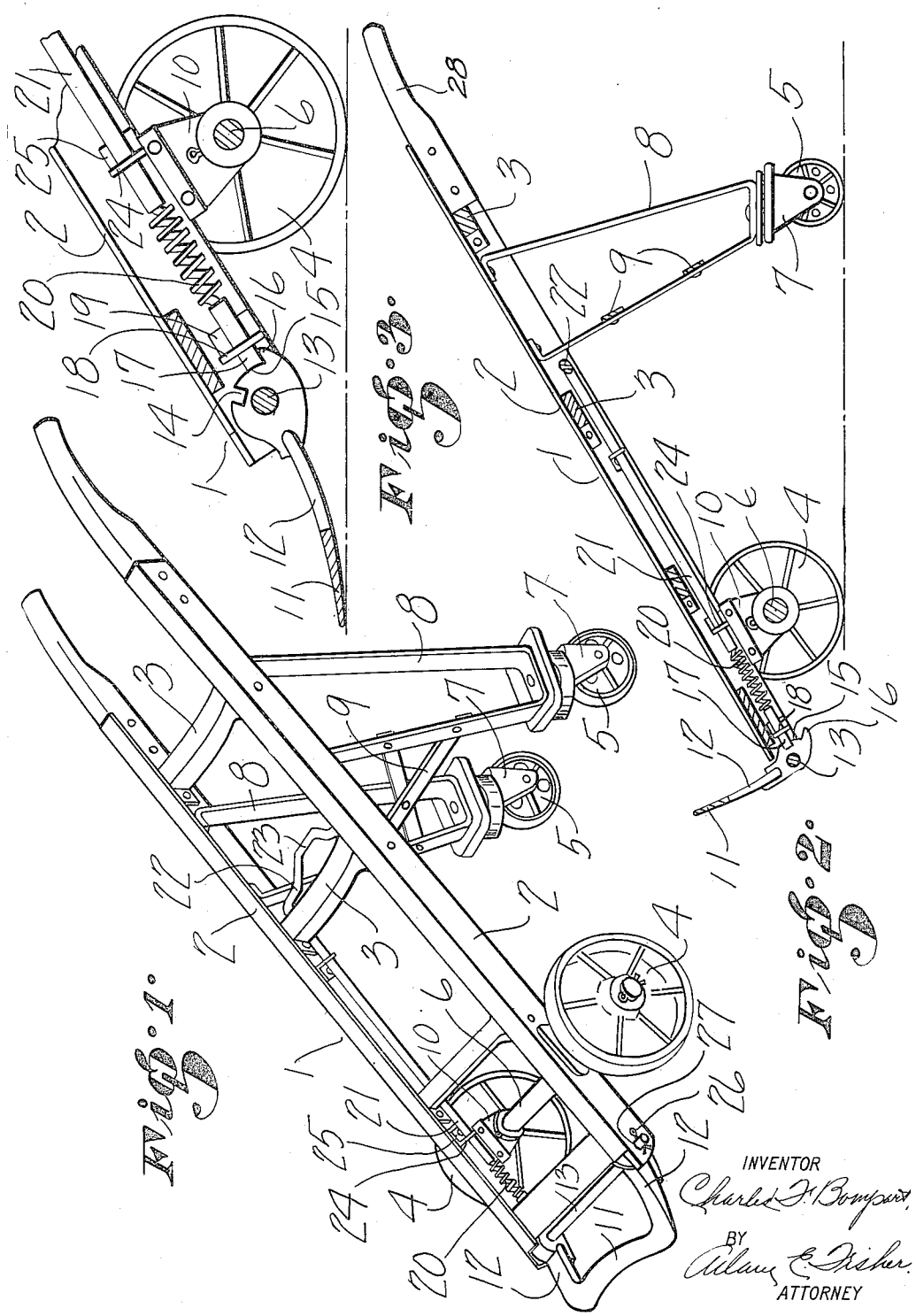
INVENTOR
Charles F. Bompart
BY
Allan E. Fisher
ATTORNEY Patented Feb. 26, 1924.

1,484,864

UNITED STATES PATENT OFFICE.

CHARLES F. BOMPART, OF ST. LOUIS, MISSOURI.

HAND TRUCK.

Application filed October 5, 1922. Serial No. 592,531.

*To all whom it may concern:*

Be it known that I, CHARLES F. BOMPART, a citizen of the United States, and a resident of the city of St. Louis, in the State of Missouri, have invented new and useful Improvements in Hand Trucks, of which the following is a specification, reference being had to the accompanying drawings.

The invention relates to hand trucks for use in warehouses, factories, storerooms, and the like for transporting heavy bales or packages of merchandise from place to place.

In the handling of such bales and packages in warehouses, much inconvenience has heretofore been experienced in loading such bales upon the ordinary trucks as now used. Ofttimes the bales are quite large and bulky and it requires several men to handle the same.

The object of the present invention is to provide a simple, practical and efficient hand truck of strong and durable construction, adapted to be readily operated by one man for easily loading on it such bales and packages as are ordinarily found in such warehouses.

A further object of the invention is to provide a truck of this character equipped with a movable apron adapted to be dropped from a position substantially perpendicular to the frame of the truck to enable it to be readily inserted beneath a bale or package, the truck frame being adapted, after the apron has been inserted beneath such bale or package, to be swung to its normal position perpendicular to the apron and of being securely locked in such position whereby the bale will be securely held in position on the apron while being tilted back onto the truck.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction, within the scope of the claim, may be resorted to without departing from the spirit or sacrificing any of the advantages of the invention.

In the drawings, in which like characters of reference designate corresponding parts in the several views:

Figure 1 is a perspective view of a hand truck constructed in accordance with this invention.

Figure 2 is a vertical longitudinal sectional view of the same, the apron being in its normal position substantially perpendicular to the truck frame.

Figure 3 is a similar view of the front portion of the hand truck, the apron being dropped to a position for ready insertion beneath a bale or package.

In carrying out the embodiment of the invention, as illustrated in the drawings, 1 designates a truck frame consisting of side bars 2 braced by cross bars 3, the side bars having handles 28 at their upper ends. The frame 1 is supported by front and rear wheels 4 and 5, the front wheels being mounted on a shaft or axle 6 and the rear wheels 5 being preferably caster wheels and mounted in pivoted brackets 7 carried by standards 8. The standards 8, which are approximately U-shaped, are constructed of suitable metal and are secured at the upper ends of their sides to the side bars of the frame 1. These standards are preferably braced by crossed inclined bars 9 centrally secured together and also secured at their ends to the said standards 8. The axle 6 is mounted in suitable bearing brackets or blocks 10 secured to the side bars of the frame 1 at the front portion of the truck frame.

The truck frame is equipped at the front with an apron 11, of approximately U-shape, constructed of suitable metal and composed of a transverse body portion and spaced sides 12, which are pivoted intermediate of their ends to the sides of the truck frame at the inner faces of the same by a transverse rod 13 which is preferably secured in perforation 27 of the side bars of the truck frame by cotter pins 26. The body portion of the apron and the sides or arms 12 are preferably tapered or wedge shaped to enable the apron to be readily inserted beneath a bale or package and the sides or arms 12 are pivoted intermediate of their ends and extend inwardly or rearwardly beyond the pivot rod 13 and are provided in their upper edges with rectangular recesses 14 and have curved upper edges 15 extending rearwardly from the recess to rear lugs 16. The rear lugs project upwardly from the upper edges of the sides or arms at the rear ends of the same and are adapted to engage sliding pins or bolts 17 for limiting the downward movement of the apron when the said pins 17 are withdrawn from the recess 14. The sliding pins 17 are mounted in suitable guides 18 at the inner faces of the sidebars of the end truck frame when the lower or outer ends of the pins 17 enter the recess 14, they firmly lock the apron 11 in a position approximately perpendicular to the frame of the hand truck.

The guides 18 which may be constructed of any suitable metal are provided with attaching portions or flanges 19 and are riveted or otherwise secured to the side bars of the truck frame and they are provided with guide openings through which the slidable pins 17 pass.

The slidable pins are connected at their upper ends to the lower ends of longitudinally disposed coil springs 20 which are secured at their upper ends to the lower ends of sides 21 of an approximately U-shaped operating frame composed of the said sides and an upper transverse connecting portion 22 which is provided with a central approximately U-shaped bend 23 which forms a grip or handle for enabling the slidable operating frame to be drawn upwardly or rearwardly to withdraw the slidable pins from the recess 14 of the arms or sides of the apron. This movement of the operating frame will permit the apron to drop to its lowered position at an obtuse angle to the frame of the truck to enable it to be readily inserted beneath a bale or package and when the apron has been properly introduced beneath the bale or package, the frame of the hand truck is swung forwardly in the direction of the bale or package to a position substantially perpendicular to the apron to reengage the slidable pins 17 in the recess 14 whereby the apron is locked in its normal position approximately perpendicular to the frame of the truck. This will enable the bale or package to be retained in position on the apron while it is being tilted rearwardly onto the truck. The slidable operating frame is mounted in guides 24 located at the inner faces of the sides of the frame of the truck and provided with attaching flanges 25. The guides 18 and 24 are of the same construction and the side bars of the truck frame may be channeled bars as shown, with separate wooden handles or any other desired construction may of course be provided. The weight of the slidable operating frame and the friction of the same in the guides will retain the pins securely in engagement with the recess of the sides or arms of the apron and there will be no liability of the pins becoming accidentally disengaged from the said recesses while the truck is in use. The lug 16 will engage the sliding pins and limit the downward movement of the apron when the pins are withdrawn from the recess 14 by a relatively slight upward movement of the operating frame. The ends of the springs may be secured to the ends of the sliding pins and the sides of the operating frame by being arranged in perforations of the said parts or any other suitable means may be employed for this purpose.

What I claim to be new and patentable is:

A hand truck comprising a frame, a front axle mounted on the frame and provided with wheels, rear standards secured to the frame at the rear portion thereof, pivoted caster wheels carried by the said standards and an apron having arms pivoted to the frame.

CHARLES F. BOMPART.

Witnesses:
 FRED H. MILLER,
 C. J. MUELLER.